(12) United States Patent
Gupta et al.

(10) Patent No.: US 10,273,156 B2
(45) Date of Patent: Apr. 30, 2019

(54) MECHANOCHEMICAL SYNTHESIS OF ALANE

(71) Applicant: Iowa State University Research Foundation, Inc., Ames, IA (US)

(72) Inventors: Shalabh Gupta, Ames, IA (US); Vitalij K. Pecharsky, Ames, IA (US); Takeshi Kobayashi, Ames, IA (US); Marek Pruski, Ames, IA (US); Ihor Hlova, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 15/118,788

(22) PCT Filed: Feb. 12, 2015

(86) PCT No.: PCT/US2015/015665
§ 371 (c)(1),
(2) Date: Aug. 12, 2016

(87) PCT Pub. No.: WO2015/123438
PCT Pub. Date: Aug. 20, 2015

(65) Prior Publication Data
US 2017/0050846 A1 Feb. 23, 2017

Related U.S. Application Data

(60) Provisional application No. 61/939,156, filed on Feb. 12, 2014.

(51) Int. Cl.
*C01B 3/00* (2006.01)
*C01B 6/06* (2006.01)

(52) U.S. Cl.
CPC .............. *C01B 6/06* (2013.01); *C01B 3/0026* (2013.01)

(58) Field of Classification Search
CPC ................................. C01B 3/0026; C01B 6/06
See application file for complete search history.

(56) References Cited

U.S. PATENT DOCUMENTS 3,812,244 A * 5/1974 Schmidt ................. C01B 6/006
423/645
8,377,415 B2 2/2013 Zidan et al.
(Continued)

FOREIGN PATENT DOCUMENTS

WO 2007133092 A1 11/2007

OTHER PUBLICATIONS

Paskevicius et al. "Characterisation of mechanochemically synthesised alane (AlH3) nanoparticles" Journal of Alloys and Compounds, vol. 487, Issues 1-2, Nov. 13, 2009, pp. 370-376.*
(Continued)

*Primary Examiner* — Amber R Orlando
*Assistant Examiner* — Syed T Iqbal
(74) *Attorney, Agent, or Firm* — Shumaker & Sieffert, P.A.

(57) ABSTRACT

In some examples, a method of forming alane ($AlH_3$), the method comprising reacting one of: 1) a $MAlH_4$, wherein M is an alkali metal; 2) alkali-metal hydride, MH; or 3) alkali-metal with one or more aluminum halides ($AlX_3$, where X is a halogen), via a mechanochemical process, to form the alane, wherein the reaction is substantially solvent free and carried out in an environment with a temperature between approximately 250 K and approximately 330 K.

18 Claims, 15 Drawing Sheets

(56) References Cited

U.S. PATENT DOCUMENTS

2004/0258613 A1* 12/2004 Heller .................. C01B 6/34
    423/646
2007/0066839 A1  3/2007  Lund et al.
2010/0068129 A1  3/2010  Hauback et al.
2012/0141363 A1  6/2012  Zidan et al.

OTHER PUBLICATIONS

Brinks, et al., "Mechanochemical Synthesis and Crystal Structure of a-AlD3 and a-AlD3," J. Phy. Chem B., Aug. 27, 2006, pp. 25833-25837.

Dinh, et al., "Novel methods for synthesizing halide-free alane without the formation of adducts," Appl Phys A., Feb. 10, 2012, 9 pp.

Paskevicius, et al., "Characterisation of mechanochemically synthesised alane (AlH3) nanoparticles," Journal of Alloys and Compounds, vol. 487, No. 1-2, Nov. 13, 2009, pp. 370-376.

Sartori, et al., "Mechanochemical synthesis of alane," International Journal of Hydrogen Energy, vol. 34, No. 15, Aug. 2009, pp. 6350-6356.

International Search Report and Written Opinion from International Application No. PCT/US2015/015665, dated May 26, 2015, 12 pp.

International Preliminary Report on Patentability from International Application No. PCT/US2015/015665, dated Aug. 25, 2016, 8 pp.

Gupta, et al., "Solvent-free mechanochemical synthesis of alane, AlH3: effect of pressure of the reaction pathway," Green Chemistry, first published online Jul. 22, 2014; pp. 4378-4388.

Hlova, et al., "Dry mechanochemical synthesis of alane from LiH and AlcL3," Faraday Discussions, Feb. 17, 2014, 170, pp. 137-153.

\* cited by examiner

MECHANOCHEMICAL SYNTHESIS OF ALANE

CROSS REFERENCE TO RELATED APPLICATIONS

This application is a national stage entry under 35 U.S.C. § 371 of PCT Application No. PCT/US2015/015665, filed Feb. 12, 2015, which claims the benefit of U.S. Provisional Application No. 61/939,156, filed Feb. 12, 2014. The entire contents of PCT Application No. PCT/US2015/015665 and U.S. Provisional Application No. 61/939,156 are incorporated herein by reference.

STATEMENT OF GOVERNMENT INTEREST

This invention was made with Government support under Contract No. DE-AC02-07CH11358 awarded by the U.S. Department of Energy. The Government has certain rights in the invention.

TECHNICAL FIELD

The present disclosure relates to the preparation/synthesis of alane.

SUMMARY

Alane ($AlH_3$, also referred to as aluminium trihydride) may be used 1) to safely store and distribute large amounts of hydrogen confined in a solid with a gravimetric capacity of approximately 10 percent hydrogen and volumetric capacity of approximately 149 kg/m$^3$, 2) to release substantially all of the stored hydrogen effectively on-demand, for use as fuel, for example in a fuel cell, and/or 3) as a solid energetic material (e.g., as a propellant). In some examples, this disclosure pertains to simplification of other methods of production of $AlH_3$ that are based on wet chemical processes, and improvement of other mechanochemical methods for its facile production in large quantities. In some examples, the disclosure entails relatively quick and efficient synthesis of $AlH_3$ at room temperature by reacting alkali metal based tetrahydroaluminates (alanates) such as $MAlH_4$ (M=Li, Na, K) or the alkali metal hydrides, LiH, NaH, or KH with aluminum halides (such as, e.g., $AlCl_3$, $AlBr_3$ and $AlI_3$) via a mechanochemical process, such as, e.g., in a shaker mill, in a planetary mill, in a jet mill, in a twin screw extruder, in a grinder, or in any other device that repeatedly transfers mechanical energy such as impact, compression, shear, elastic and plastic deformation, and strain, or a combination thereof into the reacting mixture, causing both physical and chemical changes of the reactants that are initially in the solid state. Apart from hydrogen storage for portable and stationary energy, and fuel related applications, $AlH_3$ finds use as reducing agent in organic synthesis, additives in rocket fuel and explosives, and starting material for synthesis and preparation of other complex hydrides.

In one example, the disclosure is directed to a method of forming alane ($AlH_3$), the method comprising reacting one of: 1) a $MAlH_4$, wherein M is an alkali metal; 2) an alkali metal hydride, MH; or 3) an alkali metal with one or more aluminum halides ($AlX_3$, where X is a halogen), via a mechanochemical process, to form the alane, wherein the reaction is substantially solvent free and carried out in an environment with a temperature between approximately 240 K and approximately 340 K (e.g., between approximately 250 K and approximately 330 K).

In another example, the disclosure is directed to a method comprising using alane ($AlH_3$) as a hydrogen fuel source, wherein the alane is formed by reacting one of: 1) a MAIM wherein M is an alkali metal; 2) an alkali metal hydride, MH; or 3) an alkali metal with one or more aluminum halides ($AlX_3$, where X is a halogen), via a mechanochemical process, to form the alane, wherein the reaction is substantially solvent free and carried out in an environment with a temperature between approximately 240 K and approximately 340 K (e.g., between approximately 250 K and approximately 330 K).

The details of one or more examples are set forth in the accompanying drawings and the description below. Other features, objects, and advantages will be apparent from the description and drawings, and from the claims.

DETAILED DESCRIPTION

Figure 1A:
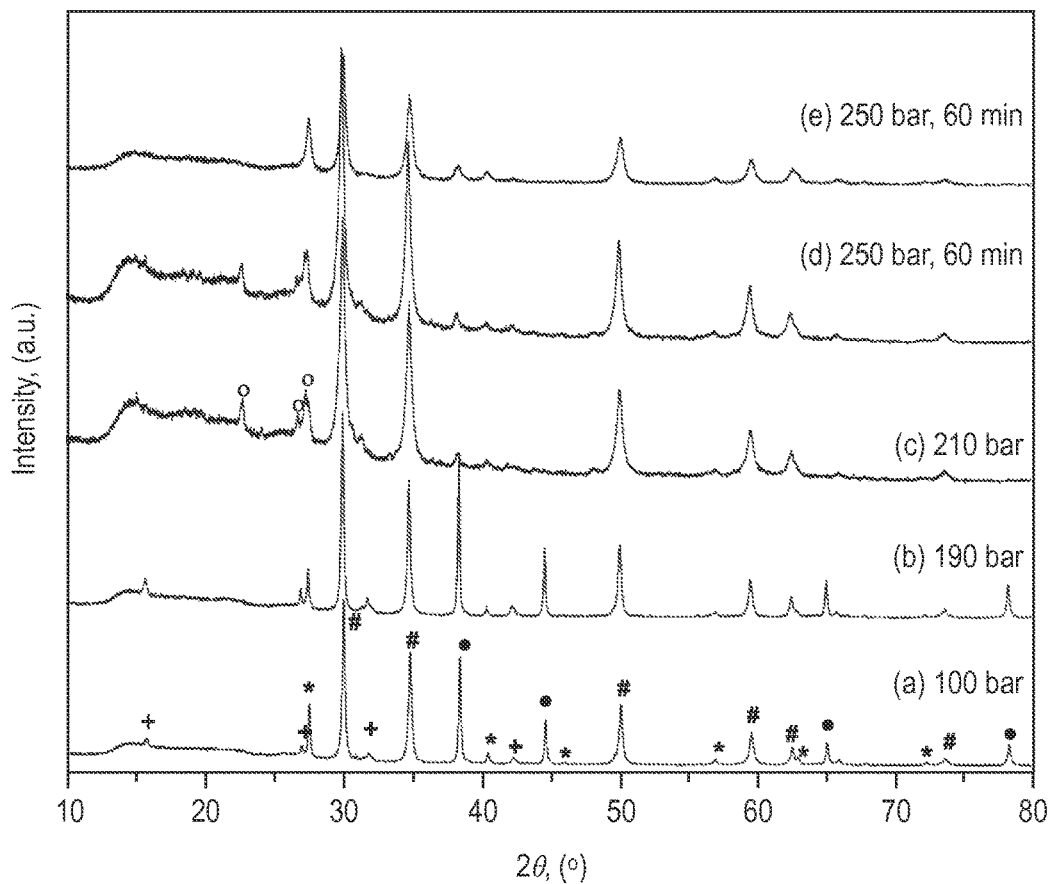
FIGS. 1A-10 are plots illustrating the results of various experiments carried out to evaluate one or more examples of the disclosure.

Realization of dwindling natural reserves of carbon-based energy sources and the tremendous environmental impact due to their indiscriminate use to meet energy demands have now led to serious efforts to transition to benign and sustainable fuels. The problem is of special importance in all forms of distributed power that currently employ primary or secondary (rechargeable) batteries based on different chemistries, including but not limited to alkaline, zinc-air, lead-acid, nickel-metal hydride, and lithium-ion batteries, and in transportation. Hydrogen in this regard is considered an ideal energy carrier as it packs high amount of energy (~142 MJ Kg$^{-1}$), is abundant (as water), and produces no harmful emissions when oxidized to generate electricity in a fuel cell. Besides its high calorific value and clean burning properties, hydrogen can be inexpensively and renewably produced by using solar power, off-peak wind- or hydroelectric power plant-generated electricity, steam reforming of the landfill gases, or from biomass among other practical methods.

Despite such exceptional traits and natural abundance, direct use of hydrogen as a fuel is severely limited by virtue of its physical properties. Although hydrogen has about three times more energy that gasoline by weight, it has about 3,500 times less volumetric energy density because of its gaseous nature at ambient conditions. It is therefore required to be highly compressed (up to 700 bar) to achieve volumetric energy density close, but still about a factor of 10 lower than hydrocarbon based fuels, which adds to the operational cost and makes refueling infrastructure complex and potentially risky. On the other hand, use of cryogenic hydrogen (e.g., gaseous hydrogen cooled to 20 K, at pressures of 6-350 bar) requires expensive and energy-inefficient liquefaction and storage processes yet with significant loss in storage due to boil-off. An alternative and more practical storage and delivery technology in which, hydrogen is packed in a solid material either as an interstitial in the lattice or as chemically bonded to metal atoms has thus come to the forefront and is being actively pursued.

According to the latest US Department of Energy (DOE) technical targets, enabling fuel-cell technologies for light-duty automobiles based on chemically stored hydrogen would require materials possessing high gravimetric capacity (e.g., greater or equal to 10 wt %), with the capability to release hydrogen at the desired rate below 373 K in order to be able to use waste heat from a fuel cell operating below 373 K. Such stringent conditions severely limit the choice of materials currently available for practical hydrogen storage purposes. For example, although hydrogen stored in intermetallic compounds such as $LaNi_5H_6$ can be recovered at room temperature at fairly fast pace, a maximum capacity of only about 2 wt. % $H_2$ can be achieved. On the other hand, chemical hydrides such as ammonia borane ($NH_3BH_3$), and complex metal hydrides such as alantates (e.g. $LiAlH_4$) or borohydrides (e.g. $LiBH_4$) offer high hydrogen capacity in the range of 7-19 wt %, but they often run into the issue of extremely retarded kinetics of hydrogen desorption and sorption due to the diffusion-limited processes, and hence poor reversibility.

In this regard, $AlH_3$ is extremely promising. $AlH_3$ offers a high gravimetric and volumetric hydrogen capacity of about 10.1 wt % and about 149 kg/m³, respectively and delivers substantially uncontaminated $H_2$ in a single step around 373 K or less depending upon the preparation history. The tremendous potential offered by $AlH_3$ is however diminished by the lack of a simple and direct method for its synthesis in a pure form. A preferred route to synthesize $AlH_3$ would be to directly combine metallic aluminum and gaseous hydrogen according to reaction (a) below:

$$Al + 3/2 H_2 \rightarrow AlH_3 \quad (a)$$

However, the high Gibbs free energy of formation of the α-$AlH_3$, for example, requires hydrogen pressure in excess of 2.5 GPa to achieve this conversion at room temperature, which is impractical for mass production of the material. $AlH_3$ has been synthesized as a pure solid in 1947 by the reaction (b) of ethereal $LiAlH_4$ and $AlCl_3$ as shown below.

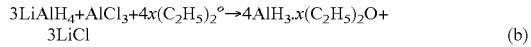

However, such $AlH_3$ could not be separated from ether-adduct without significant decomposition. Subsequently, several methods of producing non-solvated $AlH_3$ from diethyl ether were proposed with limited success and varying reproducibility. $AlH_3$ etherate may be converted by heating and drying to a non-solvated phase without decomposition only if $LiAlH_4$ and $LiBH_4$ are present during the desolvation step.

An example route for syntheses of $AlH_3$ that is based on these early developments may involve mixing of ethereal solution of $LiAlH_4$ and $AlCl_3$ in the molar ratio of 4 to 1 which leads to the reaction (b) shown above with excess of $LiAlH_4$. The resulting solution is subsequently filtered to remove the LiCl precipitate. This is followed by the addition of ether solution of $LiBH_4$ to the filtrate and vaporization of ether at room temperature. This process results in a white powder consisting of $AlH_3$ etherate ($4AlH_3 \cdot 1.2[(C_2H_5)_2O]$), $LiBH_4$, and excess $LiAlH_4$. On heating this powder at about 338 K in a sand bath for approximately 45 min, crystalline 13-$AlH_3$ is obtained. Further washing with ether is required to remove the excess $LiBH_4$ and $LiAlH_4$. This example method of production of $AlH_3$ is quite sensitive to heating conditions and requires extensive solvent evaporation step which incurs additional cost in terms of energy input. Moreover, pumping of large quantities of flammable solvent poses significant health and safety hazards.

Thus, it is highly desirable to be able to perform such a conversion in a solvent-free environment that affords unsolvated alane. There are indications that, a low temperature, direct thermochemical transformation in solid-state is feasible because of the favorable change in the Gibbs free energy as indicated in (c) below, and was successfully carried out at 348 K.

$\Delta_r G_{298K} = -191$ KJ/mol, $\Delta_r G_{77K} = -158$ KJ/mol

However, in addition to low yields, which are on the order of 40 to 60% of stoichiometric reaction (c), in a thermal reaction mentioned above one may encounter problems of heat transfer for large scale reactions unless elevated temperatures are employed which in turn may lead to undesired metallic aluminum. Fine control of temperature is required and thermal conductivity may be an issue in large batches.

Apart from the aforementioned example methods of synthesis of $AlH_3$, a more convenient, one-step solvent free mechanochemical syntheses have also been investigated to achieve this transformation. For example, synthesis of aluminum trideuteride, $AlD_3$, may be accomplished by ball milling of $3LiAlD_4 + AlCl_3$ in a planetary mill at room temperature and at 77 K. Such milling at room temperature results in a mixture of α and α'-$AlD_3$ and LiCl along with, e.g., up to 60% of undesirable metallic Al.

It is postulated that due to the large temperature spikes during mechanical mixing significant decomposition of $AlH_3$ (~60%) to metallic Al is inevitable leading to the reduced hydrogen capacity of the product. Thus, in order to avoid or slow down this decomposition, heat has to be dissipated quickly before critical temperature for thermal decomposition is reached. As indicated by the free energy change for this reaction above, the reaction is quite feasible at 77 K and may be successfully employed to suppress the formation of metallic aluminum. Although mechanochemical reaction to produce $AlH_3$ at 77 K significantly reduced formation of metallic Al, cooling of the system to such cryogenic temperatures poses severe procedural and technical challenges that could be detrimental to large scale production of $AlH_3$ using this method. Examples of the current disclosure may eliminate the need for milling under cryogenic temperature (77 K); the latter could also be cost prohibitive at large scales.

Examples of the present disclosure relate to a simple and efficient mechanochemical preparation of $AlH_3$ from alanates $MAlH_4$ (M=Li, Na), and $AlCl_3$, $AlBr_3$ and $AlI_3$ at and around room temperature. Substantially complete suppression of formation of metallic Al may be achieved in the case of $AlI_3$ under ambient temperature and pressure whereas moderate hydrogen or inert gas pressure in the range of 100-200 bar was required for $AlCl_3$ and $AlBr_3$. Substantially complete suppression of formation of metallic Al may be achieved in the case of $AlCl_3$, $AlBr_3$ and $AlI_3$ by performing mechanochemical processing in the presence of a small amount of liquid or gaseous process control agent without the need of pressurized gas. Liquid process control agents can be saturated or unsaturated, linear, branched or cyclic hydrocarbons that are liquid near room temperature or any other inert liquid that does not react nor dissolves alanates, aluminum halides, and $AlH_3$, for example hexane, heptane, isooctane, benzene, toluene, and other. Gaseous process control agent can be linear, branched, or cyclic saturated or unsaturated hydrocarbons or any other non-reactive gas at pressures between 1 and 200 bar. Quantities of liquid and pressures of gaseous process control agents are taken to be sufficient to create a layer of agent's molecules sorbed on particle surfaces, generally between 1 and 500 vol. % for the liquid, preferably between 10 and 50 vol. %, and between 1 and 200 bar, preferably between 1 and 50 bar, for the gaseous process control agents.

Examples of the disclosure relate the method of production of alane by a solvent-free mechanochemical process carried out in a ball mill. In some examples, the ball mill is kept at room temperature. Examples of the disclosure may utilize the solid-state reaction between aluminum based complex metal hydride of the general formula $MAlH_4$ (alanate) in which M is an alkali metal such as Li, Na, or K, and the chloride, bromide or iodide salts of aluminum as described in the general reaction scheme (d) below:

$$3MAlH_4 + AlX_3 \rightarrow \text{(solvent-free)} 4AlH_3 + 3MX \tag{d}$$

(M=Li, Na, K; X=Cl, Br, I)

During this mechanochemical process, which may be carried out in a horizontal planetary style ball-mill or in any other mill equipped with pressure rated container, moderate hydrogen or inert gas or gaseous process control agent pressure ranging between about 1 bar to 200 bar may be applied.

In some examples, the disclosure relates to a method of forming alane, the method comprising reacting one of: 1) a $MAlH_4$, wherein M is an alkali metal; 2) an alkali metal hydride, MH; or 3) an alkali metal with one or more aluminum halides ($AlX_3$, where X is a halogen), via a mechanochemical process, to form the alane, wherein the reaction is substantially solvent free and carried out in an environment with adding of 1 to 500 vol. % of a liquid process control agent that does not dissolve nor reacts with any of the starting materials and the formed $AlH_3$ with a temperature between approximately 240 K and approximately 340 K (e.g., between approximately 250 K and approximately 330 K).

The process may be carried out at a temperature range at which the example method was not previously thought as suitable for the formation of alane, e.g., less than 343 K and greater than cryogenic temperatures. In some examples, the temperature range may cover an ambient range for processing environments without forced heating and/or cooling. In some examples, substantially no heat is added externally or removed by cooling during the reaction. In some examples, the reaction is carried out at approximately room temperature. Room temperature may be a temperature of the environment that is between approximately 283 K and approximately 313 K.

In some examples, the reaction is carried out at a pressure between approximately 1 bar and approximately 350 bar, such as, e.g., between approximately 1 bar and approximately 200 bar for inert gases or hydrogen or between 1 bar and 50 bar for gaseous process control agents. In some examples, the reaction is carried out at substantially atmospheric pressure, e.g., where the halide comprises $AlI_3$, or when a liquid process agent is present where the halide compound comprises $AlCl_3$, $AlBr_3$, or $AlI_3$.

In some examples, the halogen comprises one of Cl, Br, or I. In some examples, the alkali metal comprises one of Li, Na or K.

In some examples, substantially no metallic Al or less than 10 wt. % metallic Al is formed by the reaction. In some examples, the reaction yields greater than approximately 50% alane, such as, e.g., greater than approximately 90% alane.

In some examples, the mechanochemical process comprises ball milling in a planetary mill or a shaker mill, but it is understood that any other type of mechanochemical equipment may be employed, including a jet mill, an extruder mill, or any other kind of a device that transfers mechanical energy into the reacting system, causing chemical transformations to occur. The milling containers (vials or extruders) and milling media (balls or screws in an extruder) can be manufactured from metals (e.g. steel, hardened steel, or alike), ceramics (e.g., tungsten carbide, WC; aluminum oxide, $Al_2O_3$; zirconium oxide, $ZrO_2$; or alike), minerals (e.g. agate or alike), glass, or plastics (e.g. polymethyl-metacrylate—plexiglass or alike). Typical milling parameters, including revolutions per minute, ball to material ratio, and alike will be dependent on the type of the mill and milling media used and they are adjusted to achieve a completion of the mechanochemical reaction between 1 min and 24 hours of continuous milling, preferably between 10 min and 60 min of continuous milling.

In some examples, the method may also include separating the resulting mixture of $AlH_3$ and alkali metal halide by using an organic solvent (such as, e.g., diethyl ether or tetrahydrofurane) to selectively dissolve $AlH_3$ and separate it from the alkali-metal by-products. If using diethyl ether or tetrahydrofuran is undesirable because they either incompletely dissolve $AlH_3$ or result in a solvated $AlH_3$ that requires further removal of a solvent, the separation can be achieved by low boiling ionic liquids, such as [EMIM]Cl (1-Ethyl-3-Methylimidazolium Chloride), which solve alkali metal halide without dissolving $AlH_3$.

In some examples, the method may include separating the resulting mixture of $AlH_3$ and alkali metal halide by flotation based on different gravimetric densities of alane (about 1.49 g/cm$^3$) and alkali-metal halides that have densities greater than about 2.07 g/cm$^3$ using an inert liquid that does not dissolve nor reacts with the $AlH_3$ product, such as $CCl_4$ (which has density of 1.59 g/cm$^3$) or decafluoropentane, $C_5H_2F_{10}$, also known as Vertrel® XF (which has density of 1.58 g/cm$^3$), or any other chemically inert liquid that has density greater than that of alane (1.49 g/cm$^3$) but lower than the density of alkali metal halide, which is dependent on both M and halogen.

In some examples, the method may include separating the resulting mixture of $AlH_3$ and alkali metal halide by ultra-centrifugation or cyclonic separation based on different gravimetric densities of alane (about 1.49 g/cm$^3$) and alkali-metal halides that have densities greater than about 2.07 g/cm$^3$ without using a solvent or an inert liquid.

In some examples, the reaction comprises:

$$3MAlH_4 + AlX_3 \rightarrow 4AlH_3 + 3MX$$

(where M=Li, Na or K; X=Cl, Br, or I).
In some examples, the reaction comprises:

$$9MH + AlX_3 \rightarrow +1.25AlX_3 \rightarrow +0.75AlX_3 \rightarrow 3AlH_3 + 9MX$$

(where M=Li, Na, or K, and X=Cl, Br, I).
In some examples, the reaction comprises:

$$9M + AlX_3 + 4.5H_2 \rightarrow +1.25AlX_3 \rightarrow + 0.75AlX_3 \rightarrow 3AlH_3 + 9MX$$

(where M=Li, Na, or K, and X=Cl, Br, I).
In some examples, the $AlX_3$ is added sequentially during the mechanochemical process.

In some examples, the method may include using the alane as a hydrogen fuel source.

In some examples, the disclosure is directed to a method including using alane as a hydrogen fuel source, where the alane is formed via one or more of the methods described herein.

In some examples, the disclosure is directed to alane formed via one or more of the methods described herein.

Experimental Results

Aspects of some examples of the disclosure are described by the following experimental procedures and results. All the manipulations were carried out in an argon filled glovebox with the oxygen and moisture levels controlled at less than 1 ppm v/v. A mixture containing the lithium alanate or sodium alanate and aluminum halide in the molar ratio of 3:1 (total mass ~1.2 g) was mechanochemically mixed in a custom designed high pressure milling vessel compatible with the Fritch P7 planetary mill. Typically, 20 chrome steel balls each weighing ~7 g (11 mm in dia.) were used as milling medium. Milling was carried out for about 60 min at the rotation speed of about 300 rpm to achieve complete conversion. Although forced air cooling was not employed, milling process was interrupted about every 2 min for 1 min to avoid rise in the average temperature; however, this may not be necessary in all cases. The products obtained by mechanochemical processing were characterized by X-ray powder diffraction (PXRD), $^{27}$Al Magic Angle Spinning-Nuclear Magnetic Resonance (MAS NMR), and gas-volumetric techniques. Hydrogen desorbed during gas-volumetric measurements, was analyzed by a residual gas analyzer system (RGA100).

Figure 1B:
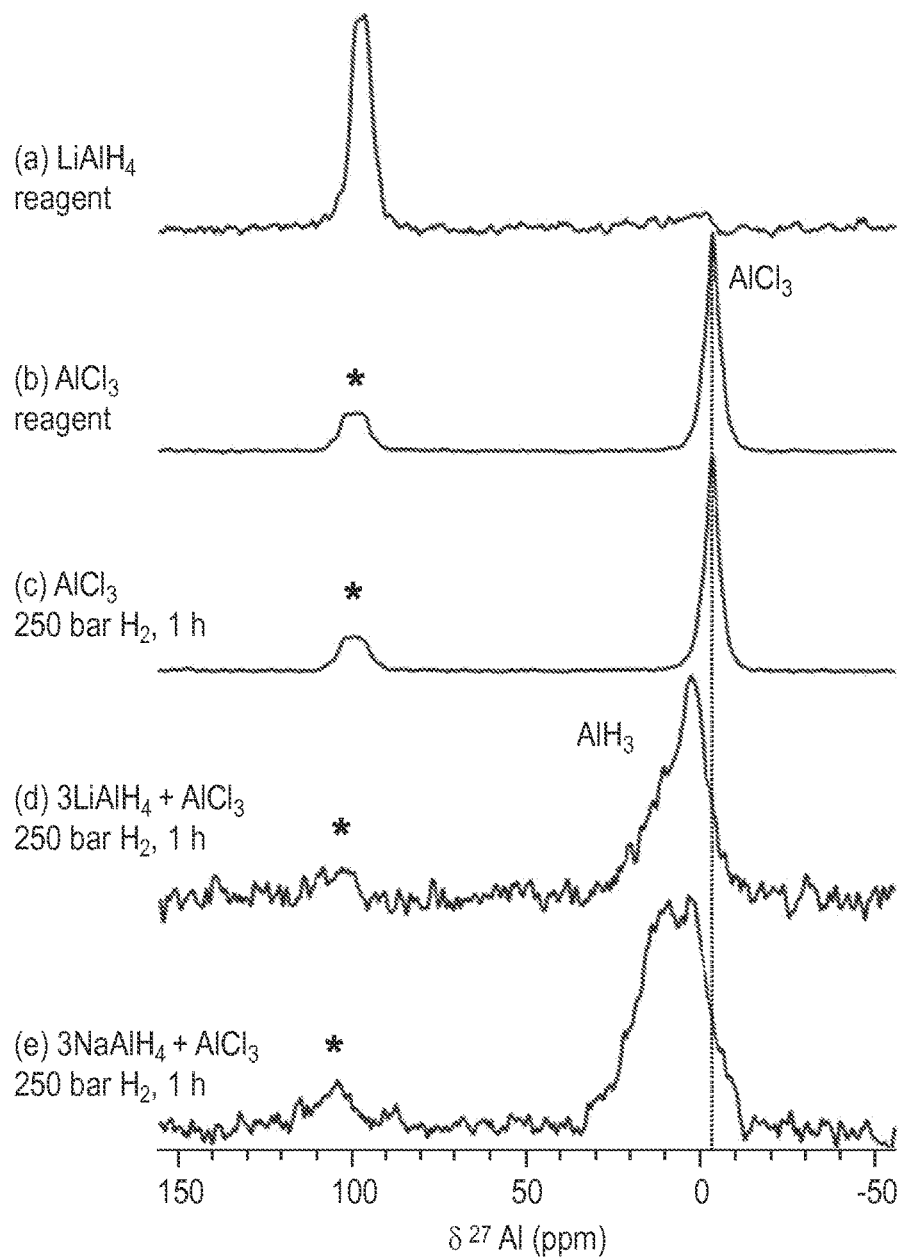

Example 1: Room Temperature Synthesis of $AlH_3$ by Mechanochemical Reaction of $3LiAlH_4+AlCl_3$ A simple mechanochemical reaction involving $LiAlH_4$ and regular grade (not certified anhydrous) $AlCl_3$ in the molar ratio of 3:1 was performed in high pressure milling containers equipped with Swagelok ball valve. In a typical reaction carried out at room temperature, ca. 1-1.2 g of powder was introduced in the milling vessel along with twenty, 11.9 mm stainless steel ball, yielding a net media to powder weight ratio (b:p) of ca. 160:1. Milling vessels were purged with hydrogen, helium, or argon, and final pressure was set as needed. When the reaction was carried out at 100 bar $H_2$ for 60 minutes under milling parameters described above, metallic aluminum and LiCl were obtained as major products, and only a small amount of the desired $AlH_3$ was obtained (both a and orthorhombic $\alpha'$-$AlH_3$ marked by * and + respectively in pattern (a) FIG. 1A, which shows the powder x-ray diffraction patterns, PXRDs, of the products after completion of the mechanochemical reaction $3LiAlH_4+AlCl_3$ performed at pressures from 100 bar to 250 bar hydrogen). On the other hand, when a similar reaction was carried out at 250 bar of $H_2$, only $AlH_3$ was obtained along with LiCl (#) (pattern (e) FIG. 1A). More importantly metallic aluminum (marked by ●) was not observed in this product. Also important is that there is a threshold (or critical) pressure, $P_c$, below which metallic aluminum forms, but above which its formation is completely eliminated as follows from (patterns (b) and (c) FIG. 1A). This result is of a significant advantage since the formation of metallic aluminum was completely suppressed while carrying out this mechanochemical transformation at room temperature. This process eliminates the need for cooling the containers by using cryogen such as liquid $N_2$ as described in an earlier patent by Brinks et al. Formation of $AlH_3$ was further confirmed by $^{27}$Al MAS NMR (FIG. 1B). The resonance peak centered at ~10 ppm clearly establishes the presence of hexa-coordinated Al with the NMR shift as expected for $AlH_3$. Also shown in FIG. 1B are the spectra for the reagents $LiAlH_4$ and $AlCl_3$ for reference. It is also noteworthy that $\alpha'$-$AlH_3$ is clearly observed in reactions with $P<P_c$ but not so much for $P>P_c$ suggesting that $\alpha'$-$AlH_3$ phase transforms to $\alpha$-$AlH_3$ during milling at $P>P_c$ or does not form at all (compare patterns b and c in FIG. 1A, for example).

Temperature programmed hydrogen desorption of the sample milled for 60 min (corresponding to pattern e of FIG. 1A) gives about 4.8 wt % $H_2$, which, considering 98% purity of the starting $LiAlH_4$, corresponds to quantitative yield of $AlH_3$ (FIG. 2), (theoretical capacity of $4AlH_3+3LiCl$ mixture is 4.85 wt. % $H_2$). In accordance with the reported thermal behavior of pure $AlH_3$, hydrogen desorption occurs in a single-step process with the onset temperature close to 373 K. Also, in agreement with the presence of $\alpha'$ and $\alpha$-$AlH_3$ phases mixed with metallic aluminum in a sample prepared at 100 bar, a total of ~1.9 wt % $H_2$ evolves during desorption, indicating that only about 40% of available aluminum is converted into $AlH_3$ at 100 bar, the remaining 60% decomposes to aluminum starting from $[AlH_4]^-$ or the formed $AlH_3$ (data not shown). In both cases, mass-spectroscopic analysis of desorbed gases indicates >99.7% $H_2$, the rest being residual air. It may be noted that it is beneficial to arrest the formation of metallic aluminum since it leads to the loss of total hydrogen storage capacity of this reaction system.

The distinct reaction products at 100 bar and 250 bar of $H_2$ highlight the effect of pressure on the progress of this mechanochemical reaction. It also suggests the existence of a critical pressure ($P_c$) at which the transition in the reaction pathway occurs. Several reactions with different applied $H_2$ pressure between 1 and 250 bar were then performed to establish $P_c$ for this reaction under experimental conditions described above. It was established that the $P_c$ for this reaction under the mechanochemical condition used is between 200-210 bar.

Further, a similar reaction was carried out at 250 bar for 30 min in order to determine the minimum milling time required under the applied milling energy regime. It was found that reaction was nearly complete but not finished within a short period of 30 min since small amount of starting $LiAlH_4$ was observed in PXRD (pattern (d), FIG. 1A) along with $AlH_3$ and LiCl. Milling for shorter periods indicated that, under the current milling energy at least 20 min of milling was required for significant progress of the reaction. Moreover, the results from these shorter time period experiments provided important clues about the mechanistic pathway of the reaction. It is understood that above $P_c$, the reaction time may be shortened by increasing the milling energy without any loss of the desired product.

In order to evaluate this mechanochemical process, reactions were also carried out under reduced milling energy, for example by reducing the b:p ratio or by reducing the milling speed. In both these cases, $P_c$ was substantially reduced. For example, when 3:1 mixture of $LiAlH_4$ and $AlCl_3$ was milled with b:p ratio of 80 instead of 160 (keeping milling speed at 300 rpm), $P_c$ dropped in the range of 150-175 bar. Further reduction in b:p to 40 however led to lower stress and shear rates and inefficient mass transfer and resulted in longer reaction time (>2 h).

In order to determine whether or not $P_c$ is related to the rate at which mechanical energy is imparted to the mixture, the milling energy was reduced by lowering the rotation speed to 150 rpm, while keeping b:p (160:1) unchanged. As expected, progress of the reaction was considerably slower due to lower shear and strain rates, and also due to reduced mass transport: it takes between 10-13 h to reach near completion. Quite surprisingly, however, by lowering the rotation speed to 150 rpm, formation of metallic aluminum can be substantially and nearly completely suppressed even at $H_2$ pressure as low as 1 bar, and, therefore, this reaction can be performed in a non-pressure rated milling container. It may also be observed that longer processing time results in a greater disorder or much smaller particles of $AlH_3$, so much so, that the latter becomes x-ray amorphous and it is much more difficult to detect in PXRD patterns with Cu $K_\alpha$ radiation. Nevertheless, the absence of metallic aluminum, the thermal desorption behavior of the sample obtained after 13 h of low energy milling, and solid state NMR spectra are all in good agreement with nearly quantitative formation of $AlH_3$. These results clearly highlight the interplay of milling energy (or the rate of energy imparted during milling) and the pressure required to preclude the formation of metallic aluminum. These finding are of significance for optimizing the energy input during large scale production using this method.

To test the possibility of reducing the reaction time at 1 bar $H_2$, milling speed was ramped to 180 and 230 rpm. Both of these attempts, however, resulted in the formation of metallic Al. Although metallic Al was not formed at 170 rpm, only a modest increase in the reaction rate was observed as compared with the reaction at 150 rpm. It was also established that the lowest milling speed at which the reaction could be completed within 1 h was ca. 230 rpm. However, the $P_c$ at this milling speed was not found to be significantly different from that at 300 rpm, namely between 180-210 bars. This indicates that there is a cut-off speed/rate above which the application of pressure becomes essential. Based on these experiments, we conclude that i) there is a threshold mechanical energy delivery rate (controlled by rpm) that requires introduction of gas pressures exceeding $P_c$ in order to suppress conversion of $[AlH_4]^-$ and/or $AlH_3$ to metallic Al; ii) $P_c$ is only weakly dependent on the rate of mechanical energy input; and iii) once the threshold is reached and exceeded, application of pressure slightly above $P_c$ does not affect reaction kinetics since all of the reactions are finished within 1 h.

We also elucidated the role of gas pressure in directing the reaction pathway in a given milling energy regime. To accomplish this we therefore examined this mechanochemical reaction under He and Ar pressures. In contrast to reactions under $H_2$ that employed standard milling conditions, metallic Al was detected only in the samples that were milled under $P^{He} \leq 125$ bar, and $P^{Ar} < 90$ bar. Thus, in general $P_c$ drops when a gas with higher molecular weight is used, which demonstrates that $P_c$ is affected by the physical properties of the ambient atmosphere, i.e. by a simple presence of high pressure gas as a processing medium.

To verify that the above mentioned transformations proceed only under high-energy milling conditions as provided by the planetary mill, the following experiments were carried out. A total of 100 mg of $LiAlH_4$ was mixed with $AlCl_3$ in the molar ratio of 3:1 in an agate mortar and ground under argon atmosphere. No sign of reaction was observed after 10-15 min of grinding. This was further confirmed by powder x-ray diffraction analysis of the ground product, which only showed the presence of starting compounds.

Figure 3A:
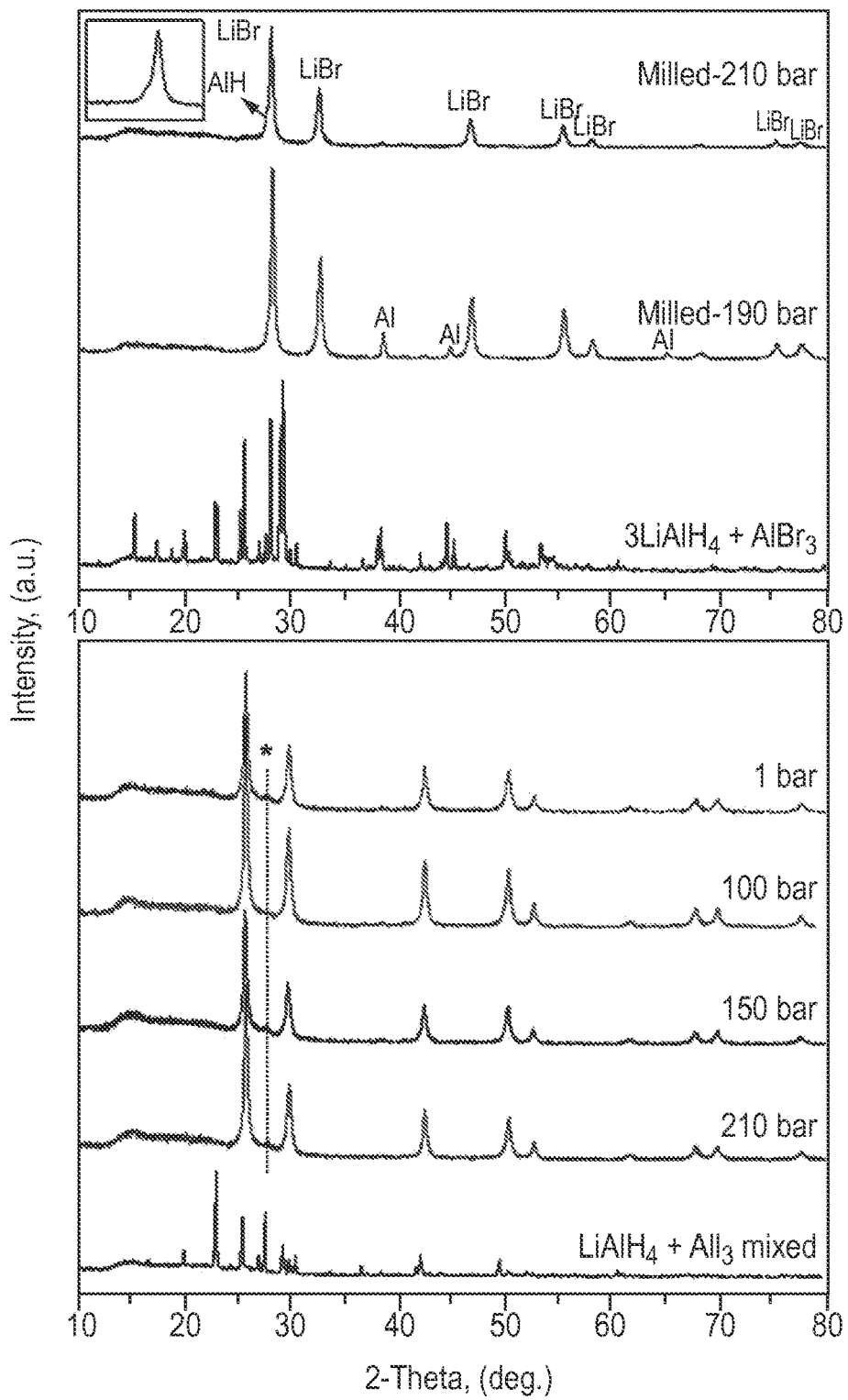

Example 2: Room Temperature Synthesis of $AlH_3$ by Mechanochemical Reaction of $3LiAlH_4+AlI_3$ Millings were performed at several $H_2$ pressures as indicated in FIG. 3A (bottom panel). Analysis by PXRD of the products obtained after 60 minutes of milling shows that in all cases LiI formed as a major product, clearly indicating the completion (no starting material remained) of the reaction (e) below.

$$3LiAlH_4 + AlI_3 \rightarrow 4AlH_3 + 3LiI \quad (e)$$

Figure 3B:
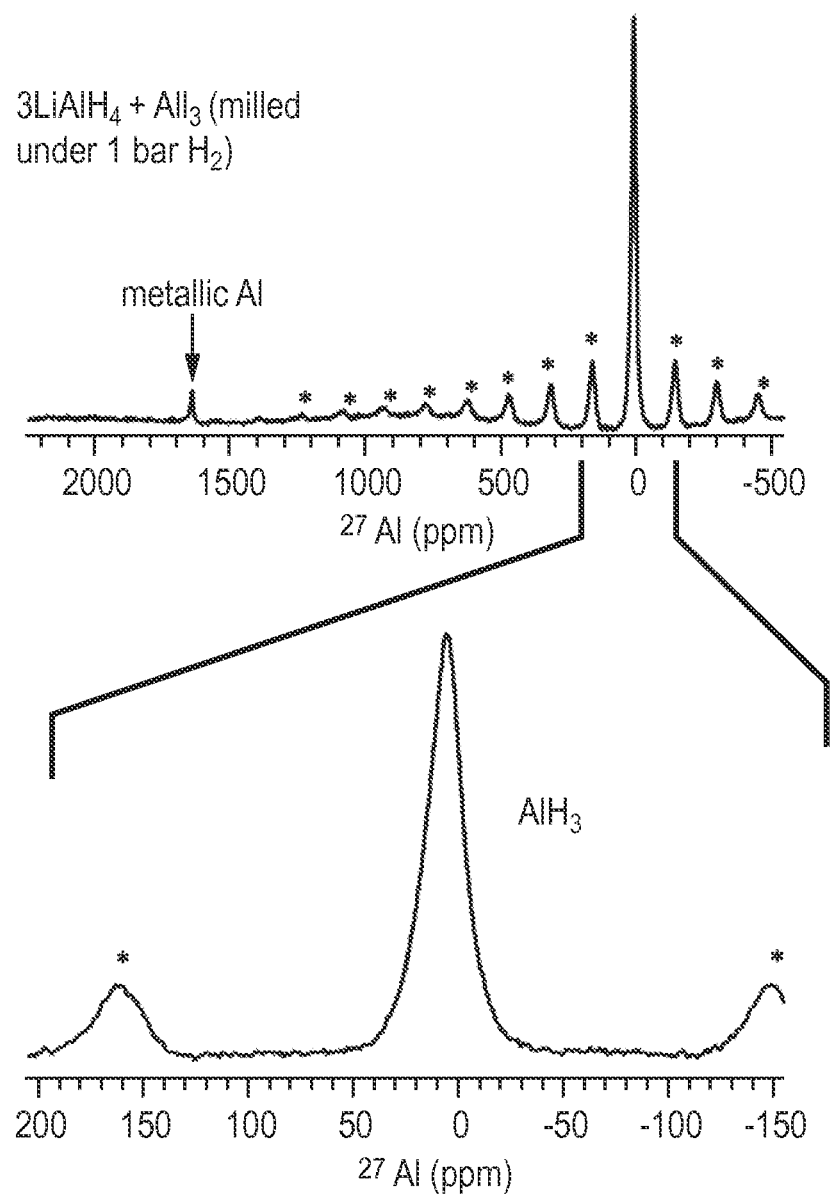

Apart from LiI, a small peak is clearly visible at $2\theta \sim 27.5°$ (marked by asterisk in FIG. 3A) which corresponds to the strongest reflection from $\alpha$-$AlH_3$ phase with rhombohedral symmetry (space group R-3c). Formation of $AlH_3$ was also confirmed by $^{27}Al$ solid state NMR (FIG. 3B) which showed resonance peak at ~10 ppm, as expected for octahedrally coordinated Al as found in $AlH_3$.

Figure 2:
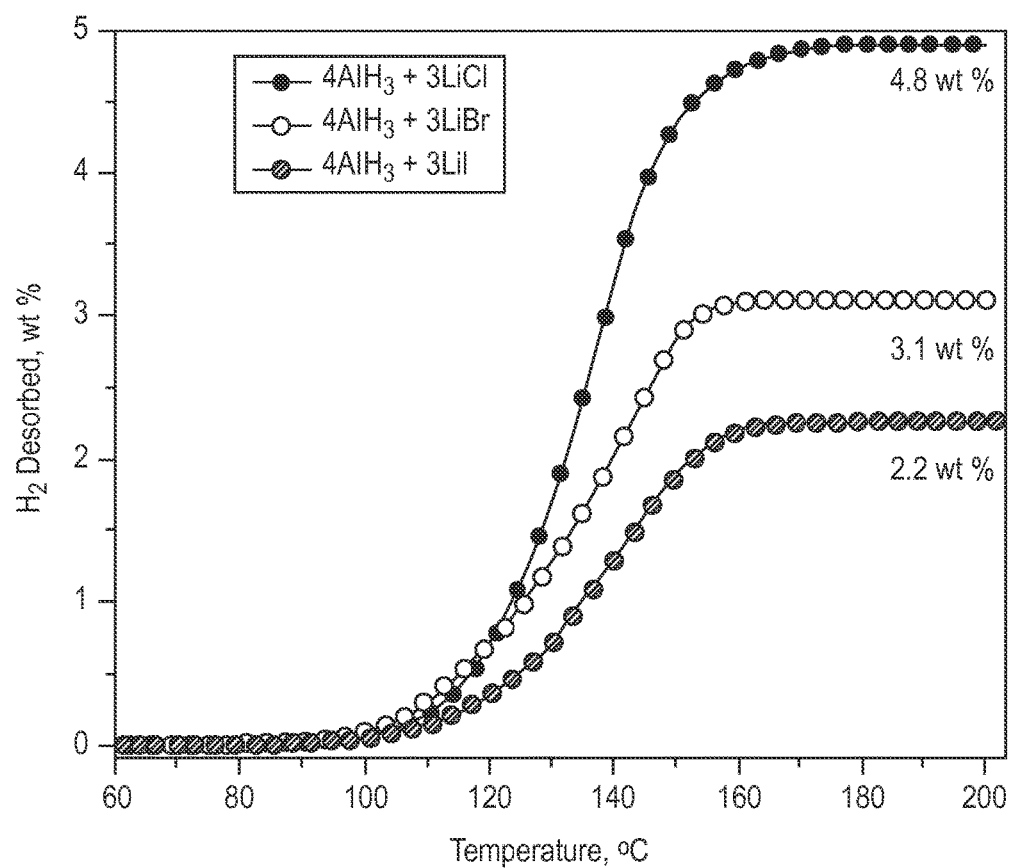

FIG. 2 illustrates hydrogen desorption plots of mixtures of $LiAlH_4$ and $AlX_3$ (X=Cl, Br, and I) in the ratio of 3 to 1, milled for 60 min. under 1 bar of $H_2$ for $AlI_3$ and 250 bar for $AlCl_3$ and $AlBr_3$. Temperature programmed hydrogen desorption of the products obtained as shown in reaction (e) above yielded ~2.2 wt. % $H_2$ (FIG. 2) which corresponds to greater than 97% of $AlH_3$ yield (considering 98% purity of starting $LiAlH_4$). In accordance with the reported desorption behavior of $AlH_3$, hydrogen was found to desorb in a single-step process with the onset temperature close to 373 K. Mass-spectroscopic analysis of desorbed gases indicated 99.7% $H_2$ the rest being residual air.

The ability to successfully carry out this reaction at room temperature eliminates the need for expensive and hazardous cryogenic cooling required to suppress the formation of aluminum. Considering the ease of carrying out the reaction under ambient temperature and pressure, the process can be readily scaled up for industrial production. Although mechanochemical synthesis of $AlH_3$ from the reaction of $LiAlH_4$ with $AlCl_3$ and $AlBr_3$ is known in the literature (it leads to formation of large quantities of metallic Al when carried out at room temperature, and milling in a cryogenic regime at 77 K was required to suppress the formation of Al), we are unaware of any such report suggesting the use of $AlI_3$.

It may be noted that, although mechanochemical synthesis of $AlH_3$ using the procedure described here is solvent-free, the subsequent method of obtaining pure $AlH_3$ entails separation from MX (M=Li, Na, K; X=Cl, Br, I). The current procedure is nevertheless highly desirable since the $AlH_3$ formed in this process is not solvated (e.g as ether-adduct), and may be separated from MX salt by using relatively small amounts of solvent(s) as compared to for the preparation of $AlH_3$ in diethyl ether.

The method described herein also affords reactions which lead to the by-product LiI, that has the density of about 4.08 g/mol, which is about 2.5 times that of $AlH_3$ (1.49 g/mol) as opposed to LiCl, which has a density of about 2.07 g/mol. Such large difference in the density of the materials to be separated is conducive for the development of simple flotation separation techniques that are applicable to large scale process, and are well known in, for example, beneficiation of ores. Other separation techniques include ultracentrifugation or cyclonic separation, thus completely eliminating the use of solvents.

Example 3: Room Temperature Synthesis of $AlH_3$ by Mechanochemical Reaction of $3LiAlH_4+AlBr_3$ Similar mechanochemical reactions were also performed with anhydrous $AlBr_3$. It was found that the $P_c$ in this case lies between 190-210 bar which is in the same region as for $AlCl_3$. The X-ray diffraction patterns of the two reactions carried out at 190 and 210 bar is shown in FIG. 3A (top panel). The products obtained from the latter reaction were subjected to temperature programmed decomposition analysis, which showed $H_2$ desorption of 3.1 wt. % which (FIG. 2) corresponds well with the theoretical weight capacity of 3.15 wt % assuming 100% conversion to $AlH_3$.

Although the current disclosure entails application of $H_2$ or inert gas pressure in the case of $AlCl_3$ and $AlBr_3$, the required pressure is in the moderate range of 100-200 bar. To put this in perspective, the current state-of-art cylinder technologies such as availability of seamless containers, and use of quenched and tempered chrome-molybdenum alloy steels could easily afford working pressures in the range of 200 to 300 bar thus completely eliminating the need for pressure boosters that may be energy intensive.

Example 4: Room Temperature Synthesis of $AlH_3$ by Mechanochemical Reaction of $NaAlH_4$ with $AlCl_3$ Similar milling experiments were carried out with $NaAlH_4$ and $AlCl_3$ to investigate whether the nature of precursors affects the $P_c$. Although both $LiAlH_4$ and $NaAlH_4$ feature tetrahedrally coordinated aluminum atoms, their crystal structures are quite different. Whereas, $LiAlH_4$ adopts a monoclinic structure with $P2_1/c$ space group, $NaAlH_4$ crystallizes in a tetragonal space group $I4_1/a$.

Figure 4A:
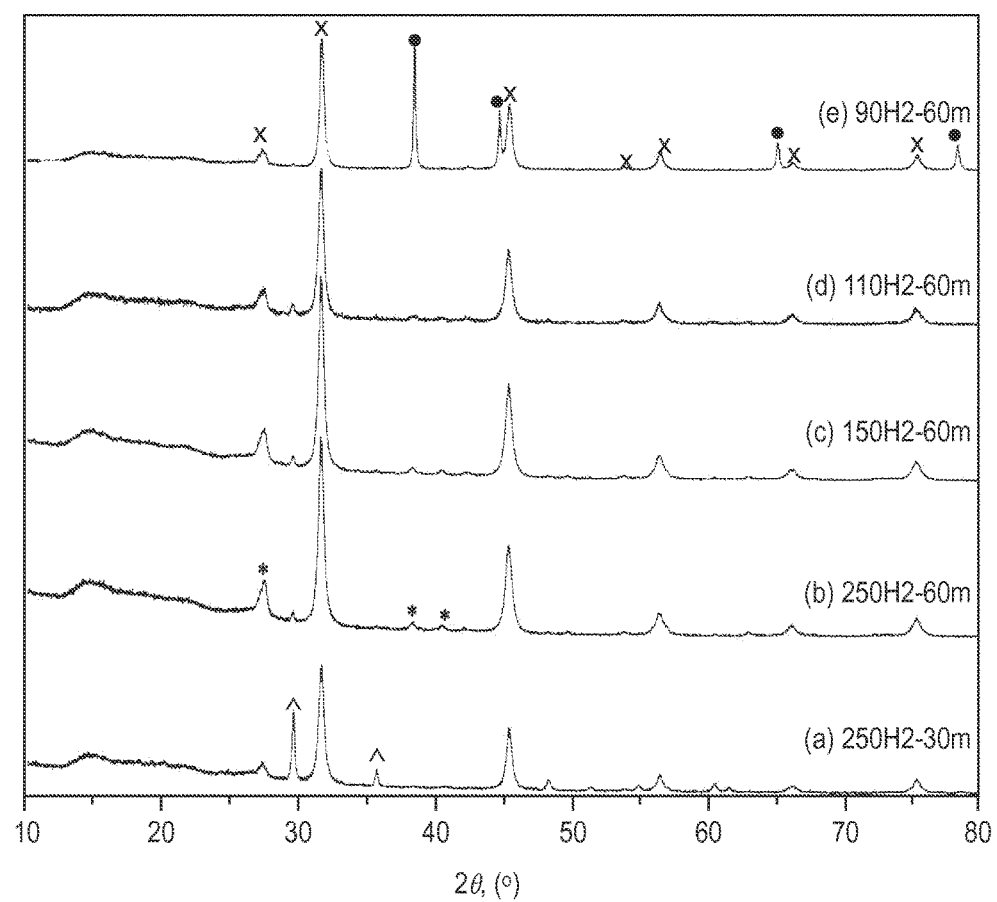

FIG. 4A illustrates X-ray diffraction patterns of the products obtained after milling of 3:1 molar mixture of $NaAlH_4$ and $AlCl_3$ for 30 minutes at 250 bar hydrogen, and 60 minutes at pressures between 90 and 150 bar.

Figure 4B:
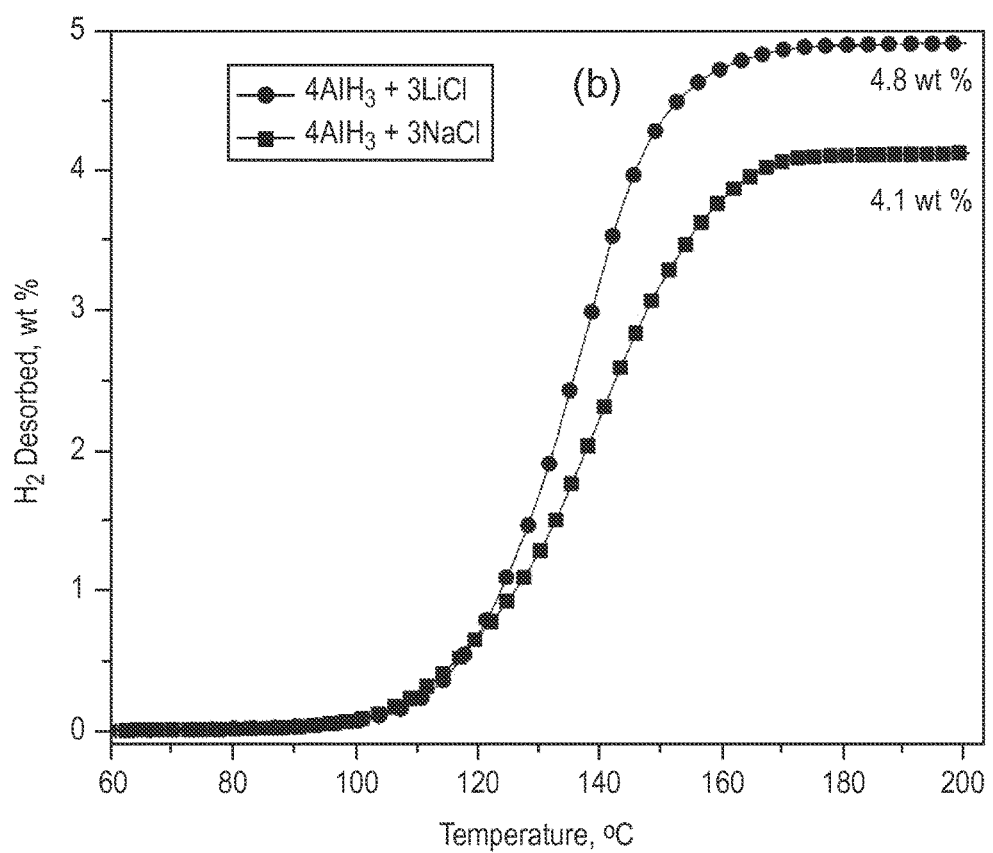

As shown in FIG. 4A, pattern (a) indicates that after 30 min of milling under 250 $H_2$ pressure, significant amounts of $NaAlH_4$ (marked by A) remained unreacted which is in contrast to $LiAlH_4$ in which case reaction was essentially complete at this point. However, the progress of the reaction, albeit slower than in the case of $LiAlH_4$ is clear from the formation of NaCl (peaks indicated by x). Along with NaCl and the unreacted $NaAlH_4$, formation of $\alpha\text{-}AlH_3$ is also clearly indicated by peaks appearing at $2\theta=27.59$, 38.37 and $40.53°$ (marked by *). It may be noted that, the broadening of the peak close to $2\theta=27.59°$ is caused by an overlapping peak from NaCl and $\alpha\text{-}AlH_3$ phases. On extending the reaction time to 60 min (pattern (b)), close to complete conversion was achieved as indicated by diminished signals from $NaAlH_4$ and enhanced signal from $\alpha\text{-}AlH_3$. Temperature programmed hydrogen desorption of the sample milled for 60 min (corresponding to pattern d) gives ~4.1 wt % $H_2$ (FIG. 4B, black filled squares), which is close to the theoretical capacity of 4.2 wt %, considering 100% conversion to $AlH_3$.

Once the reaction time was optimized, several reactions were carried out at $H_2$ pressures between 50-250 bars to determine $P_c$ (patterns c-e). In stark contrast to $LiAlH_4$, for $NaAlH_4$ the $P_c$ was found to be between 100-110 bar which is nearly half the $P_c$ found in case of $LiAlH_4$. Mechanochemical reaction between $NaAlH_4$ and $AlCl_3$ under $H_2$ pressure is thus characterized by slower kinetics but more favorable thermodynamics as compared to $LiAlH_4$. Thus, although not well understood at this time, dependence of $P_c$ on the nature of the starting alanate seems to be inherent in the mechanistic pathway of the reaction. It may further be noted that, in contrast to $LiAlH_4$, formation of $\alpha'\text{-}AlH_3$ was not observed in case of $NaAlH_4$ below $P_c$.

Example 5: Room Temperature Synthesis of $AlH_3$ by Mechanochemical Reaction of LiH and $AlCl_3$ We have also established the possibility of solvent free mechanochemical synthesis of $AlH_3$ by metathesis reaction between LiH and $AlCl_3$. It may be noted that commercially, $LiAlH_4$ is produced by the reaction of LiH and $AlCl_3$ in 4:1 molar ratio in ethereal solution. Thus, mechanochemical preparation of $AlH_3$ in a one-pot process, starting from LiH (which is easily produced by direct hydrogenation) may have a significant cost advantage.

However, direct mechanochemical processing of LiH and $AlCl_3$ in 3:1 molar ratio, according to the reaction:

$$3LiH + AlCl_3 \rightarrow AlH_3 + 3LiCl \quad (f)$$

(300 rpm, 350 bar, 1 h, 20 balls) does not proceed as desired under the said milling parameters or takes much longer time to complete when milling energy is reduced. Instead, metallic aluminum is obtained as a major product and hydrogen is eliminated as gas according to the reaction (g) below.

$$3LiH + AlCl_3 \rightarrow Al + 3LiCl + 3/2 H_2 \quad (g)$$

In the method described herein, formation of metallic aluminum is completely eliminated by introducing LiH and $AlCl_3$ in the ratio of 9:1 instead of the stoichiometric amounts, and milling the mixture under 350 bar $H_2$ for about 48 min (process 1). This was followed by the sequential addition of $AlCl_3$ to the pre-milled 9:1 mixture to achieve the final stoichiometry of $3LiH:1AlCl_3$ as outlined in the scheme (h) below (processes 3 & 4).

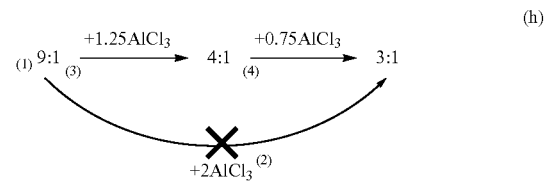

(h)

Figure 5:
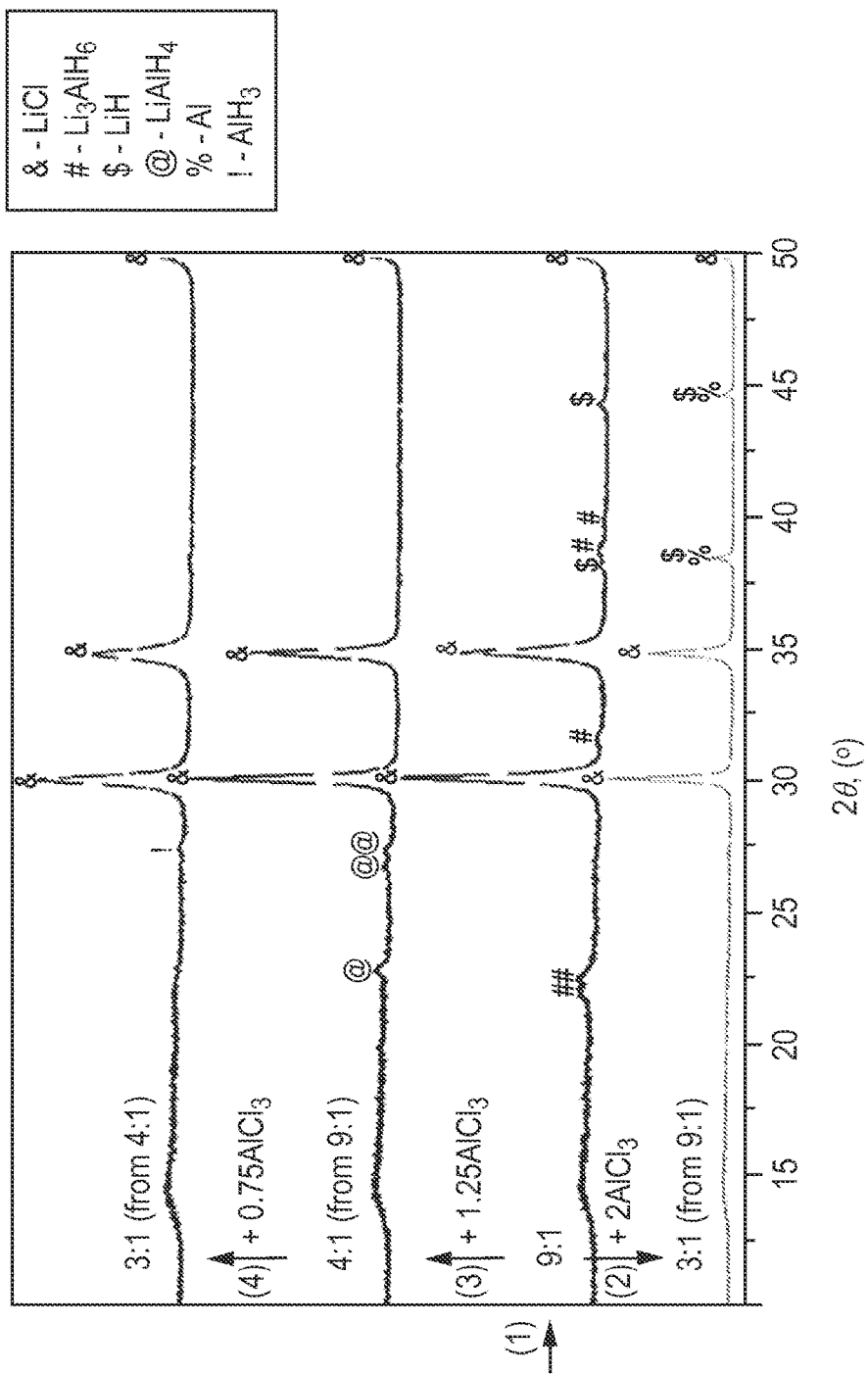

The evolution of phases during this mechanochemical process is shown in FIG. 5, which shows X-ray diffraction patterns of products corresponding to processes 1, 2, 3, and 4 as indicated in scheme (h). It may be imperative that addition of $AlCl_3$ to 9:1 mixture is carried out in a sequential manner. Thus, in the second step, 1.25 mole equivalents of $AlCl_3$ were added to achieve the molar ratio of 4:1 followed by milling for up to 48 min (process 3 in FIG. 5). The remaining 0.75 mole equivalents of $AlCl_3$ were then added to achieve the final ratio of 3:1, and milling was carried out for another 48 min to achieve complete conversion (process 4 in FIG. 5). As represented by the process 2 in FIG. 5, a direct transition from 9:1 to 3:1 resulted in metallic aluminum.

The successful execution of this mechanochemical process may be contingent upon how well the competing reaction that led to metallic aluminum is suppressed. By using excess LiH in the starting mixture, the following reactions occur more favorably and prevent precipitation of metallic aluminum.

Process 1:

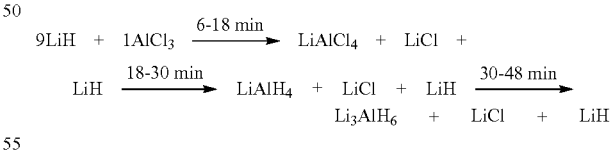

It was also noted that for this method to be successful, optimal starting ratio of LiH to $AlCl_3$ may be 9:1. On reducing the LiH—$AlCl_3$ ratio to 6:1 or 4:1 in the starting mixture, formation of metallic aluminum was noted under identical milling parameters. It was also established that the critical pressure, $P_c$ that was needed for successful execution of process 1 was ca. 300 bar. It was also established that a direct reaction of LiH and $AlCl_3$ in stoichiometric proportion is also possible if the milling speed is reduced from 300 rpm to 150 rpm. The reaction time in this case however increases by more than 5-fold.

Considering that LiH is formed by direct hydrogenation of Li with $H_2$, the process described in this section may also be carried starting from metallic Li, $AlCl_3$ and gaseous hydrogen. The vial is loaded with Li and $AlCl_3$ in 9:1 Li:Al molar ratio and pressurized with 300 bar hydrogen. The milling proceeds for 30-60 min. An additional amount of $AlCl_3$ is then added to achieve 4:1 Li:Al stoichiometry, the vial pressurized to 300 bar $H_2$, and the milling continues for 30-60 min. Finally, a quantity of Li to reach the 3:1 Li:Al, stoichiometry followed by pressurizing with $H_2$ and additional 30-60 min of milling in 300 bar $H_2$ completes the process with a nearly quantitative yield of $AlH_3$.

Example 6: Mechanochemical Reaction of $xLiAlH_4$ (x=4-6) and $1AlCl_3$

Figures 6A, 6B:
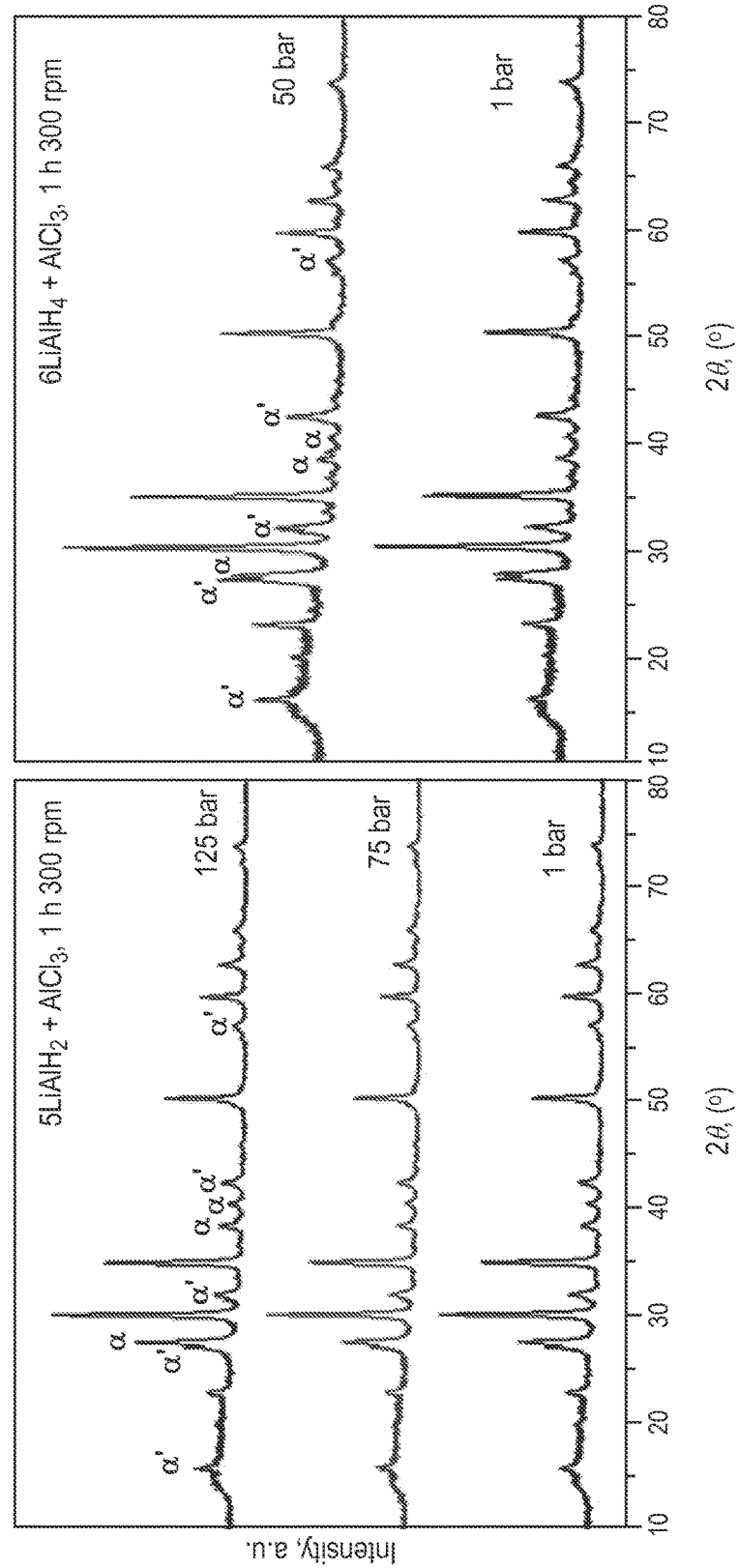

As described in Examples 1 and 3-5, it may be necessary to apply a gas pressure in the range of about 100-200 bar in order to suppress the formation of metallic aluminum while maintaining high rates of transformation. It may however be economically advantageous to completely eliminate the need for working pressures higher than 1 bar. It is discovered that if more than the stoichiometric amounts of hydride precursors are employed, the transformation can be carried out under ambient pressure of any inert gas or hydrogen without compromising the rate of the reaction. For example, when 5 or 6 molar equivalents of $LiAlH_4$ (instead of 3 equivalents needed for stoichiometric reaction) were employed in a reaction with 1 equivalent of $AlCl_3$, the transformation could be successfully carried at 1 bar of $H_2$ or argon pressure without any trace of metallic aluminum in the final product. The X-ray diffraction patterns of products from reactions $XLiAlH_4+1\ AlCl_3$ (x=5 (FIG. 6A) and x=6 (FIG. 6B)) carried under various $H_2$ pressure are shown in FIGS. 6A and 6B. The XRD patterns clearly show that the reactions at 1 bar do not produce any metallic aluminum and the completion of the reaction is marked by the absence of Bragg peaks from $AlCl_3$ and the intermediate compound $LiAlCl_4$. Characteristic Bragg peak from the unreacted $LiAlH_4$ appears close to 22.5° and its intensity scales according to the expected unreacted proportion of $LiAlH_4$, i.e. $5LiAlH_4+1AlCl_3 \rightarrow 4AlH_3+3LiCl+2LiAlH_4$ and $6LiAlH_4+1AlCl_3 \rightarrow 4AlH_3+3LiCl+3LiAlH_4$, respectively. In addition to these results, the XRD patterns clearly highlight the preferential crystallization of the α' or the α polymorph of alane with the increasing the ratio of the hydride in the starting mixture (apart from the absence of metallic Al at 1 bar pressure). The effect of milling pressure on the preferential crystallization of α' phase is however less distinctive.

Figure 7A:
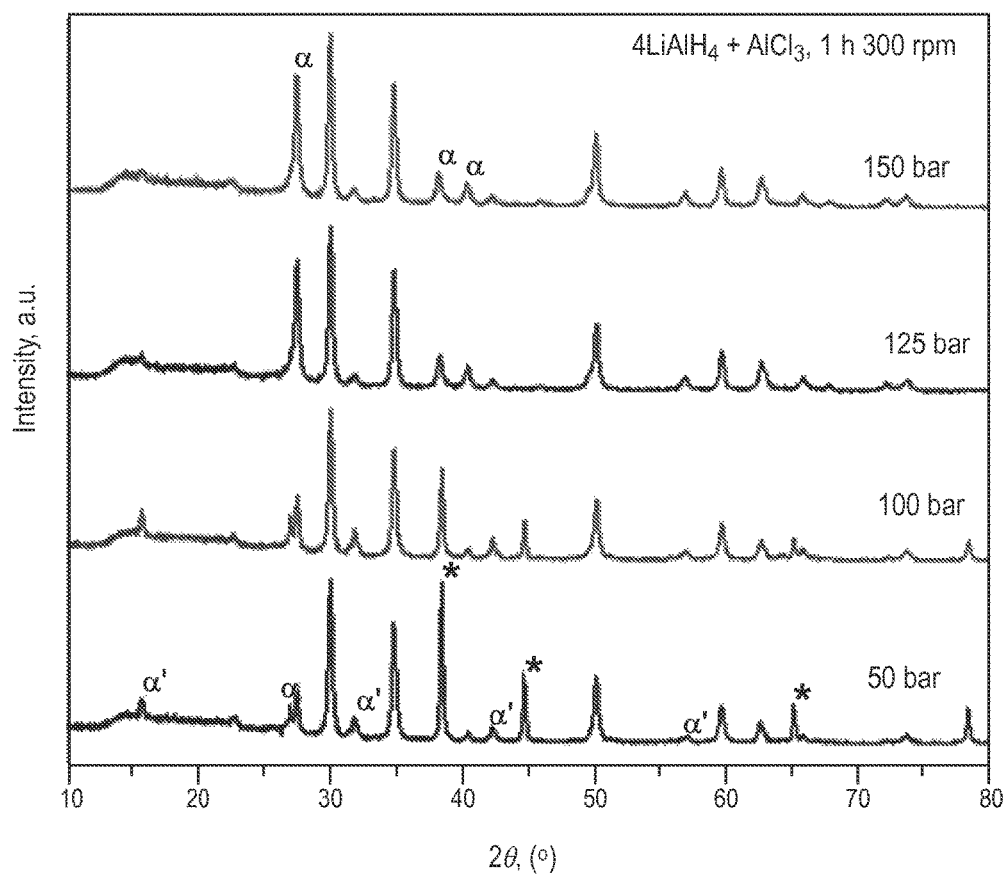
Figure 7B:
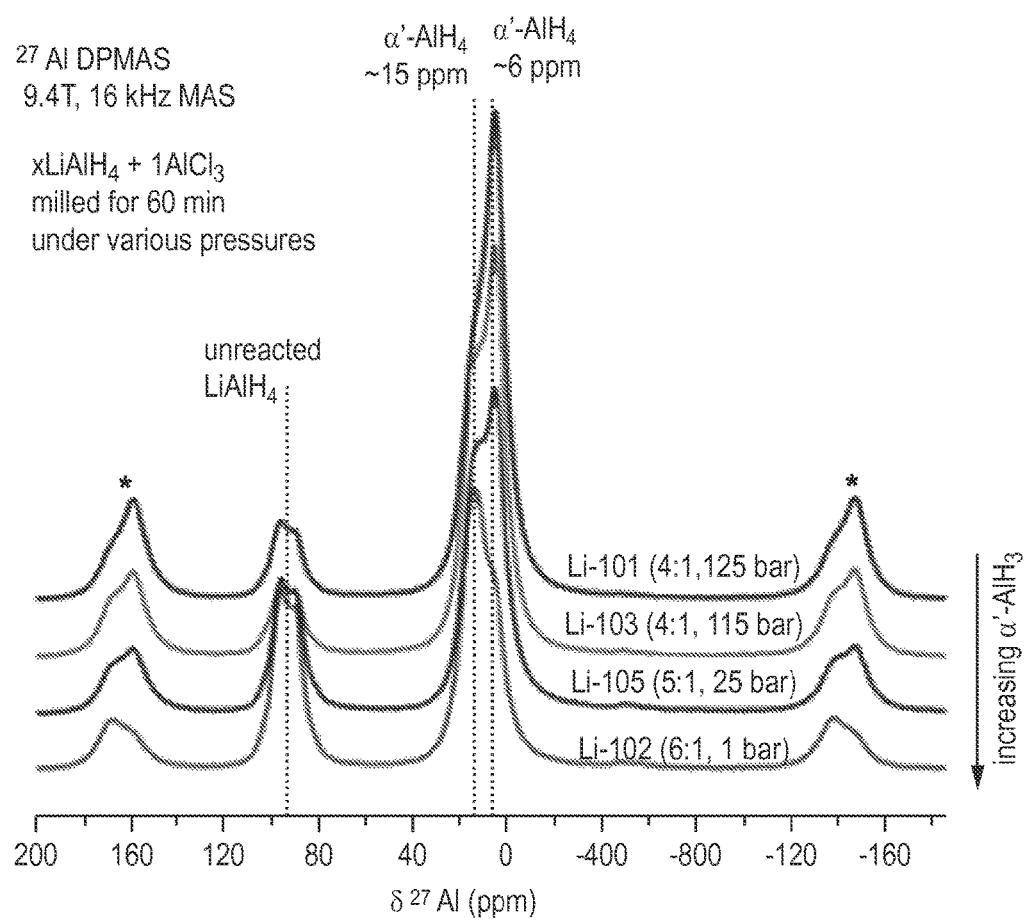

In contrast to the reactions with x=5 and 6, the reaction with x=4 could not be carried out successfully below 100 bar. As shown in the XRD patterns in FIG. 7A, reactions carried under 100 bar and below produced significant quantities of metallic aluminum, marked by *. The formation of α'-alane is quite insignificant for x=4 at $P>P_c$, which is between 100 and 125 bar. The proportional scaling of α'-alane with the value of x is more clearly evident from the $^{27}Al$ solid-state NMR shown in FIG. 7B. Thus, the resonance at ~15 ppm, attributed to the α'-alane, becomes increasingly more prominent as the value of x is increased from 4 to 6; simultaneous reduction in the signal intensity at ~6 ppm is observed which is attributed to the decline of α-polymorph. Thus, it may be argued that presence of excess $LiAlH_4$ in the starting mixture not only induces better crystallization of α'-alane (as one may infer from PXRD alone), but in fact promotes the formation of a' over α-alane. This may result from the reaction going through a modified reaction pathway in the presence of excess $LiAlH_4$, and further studies will be required to gain better understanding. The possibility to eliminate the need for pressurizing the milling containers can have significant operational and safety advantages during the large scale production.

Thus, it was clear that the critical pressure required to control the reaction pathway scales with the amount of hydride reagent in the starting mixture. Table 1 below summarizes this relationship.

TABLE 1

| X in $XLiAlH_4$—$AlCl_3$ | Critical hydrogen pressure milling (in bar) |
|---|---|
| 3 | ~200 |
| 4 | ~100 |
| 5 | 1 |
| 6 | 1 |

Figure 8A:
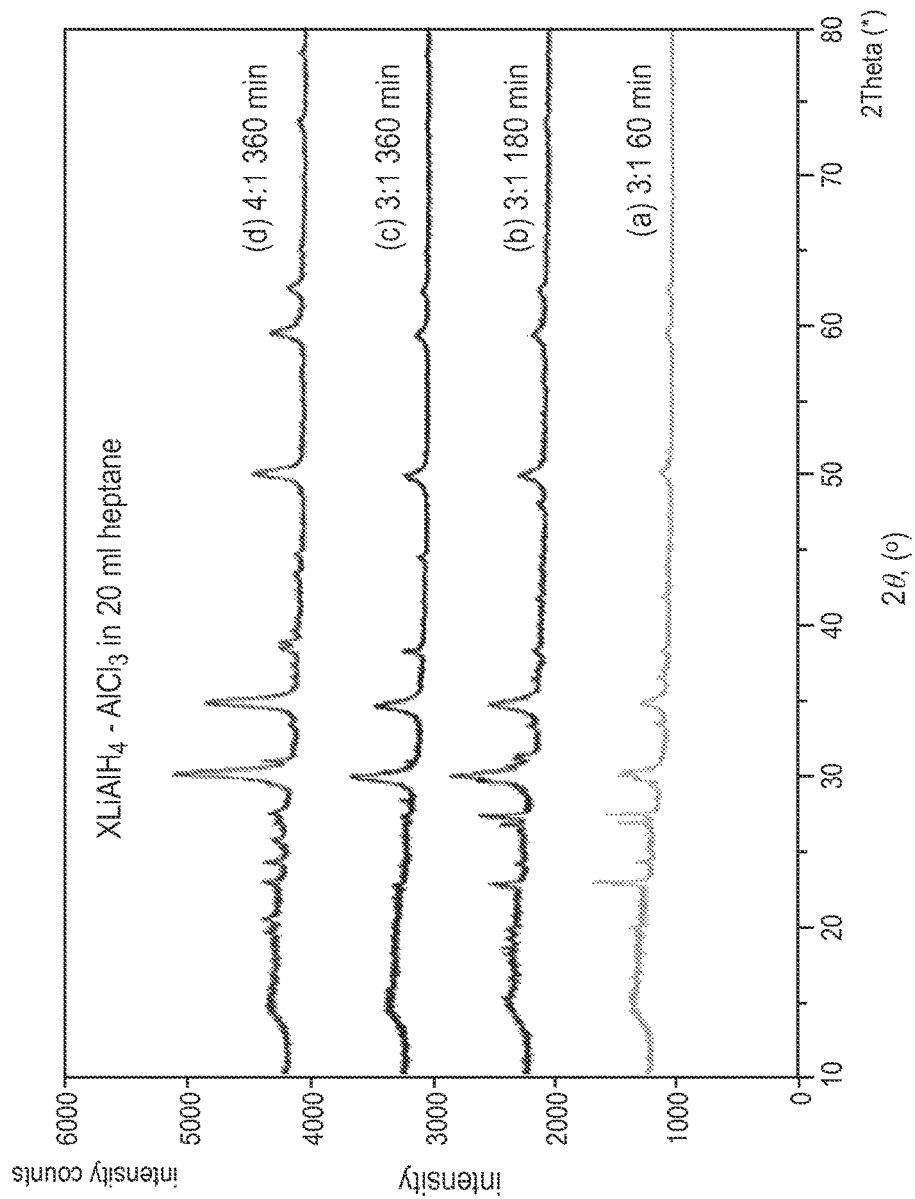

Example 7: Mechanochemical Reaction of $xLiAlH4-AlCl_3$ in Inert Hydrocarbons Such as Heptane Based on the results described in previous examples in which pressure is one of the key parameter in controlling the reaction pathway, it could be argued that high pressure gas behaves similar to a fluid medium that essentially controls the energy transfer from milling media to the reaction mixture. In accordance with this argument, reactions were carried out in which high pressure gas was replaced with 1-20 ml of inert liquid hydrocarbon such as heptane ($C_7H_{16}$), while other parameters were kept unchanged. The time-sampled XRD powder patterns of a 3:1 mixture of $LiAlH_4$ and $AlCl_3$ are shown in FIG. 8A (patterns a-c). As is seen clearly from these patterns, the reaction proceeds in the intended direction and no metallic Al is formed. The XRD patterns also however reveal that the rate of transformation is considerably slower as is expected due to the reduced energy transfer from ball to powder in the presence of liquid medium. For example, the intermediate $LiAlCl_4$ is clearly seen after 180 min of milling, and the reaction is nearly complete only after about 6 h of milling.

Figure 8B:
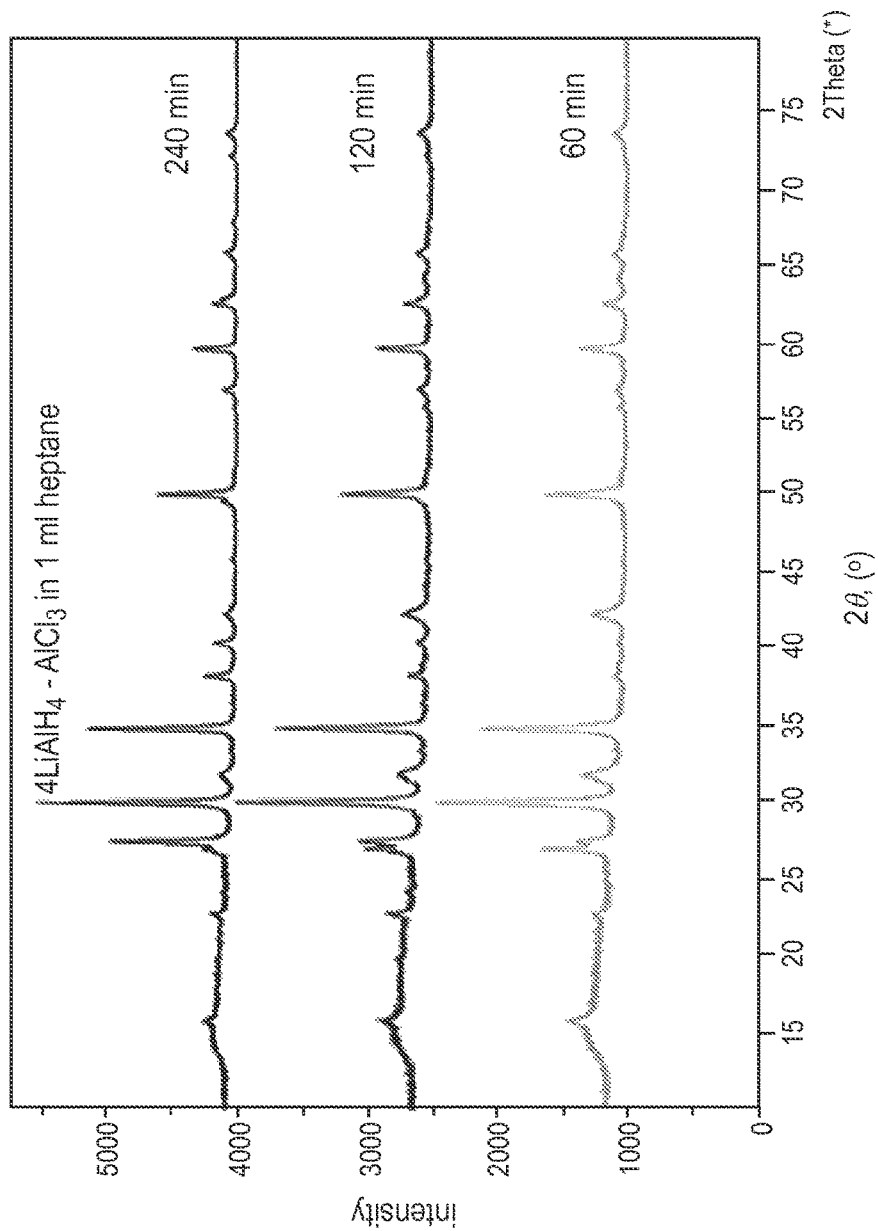
Figure 9:
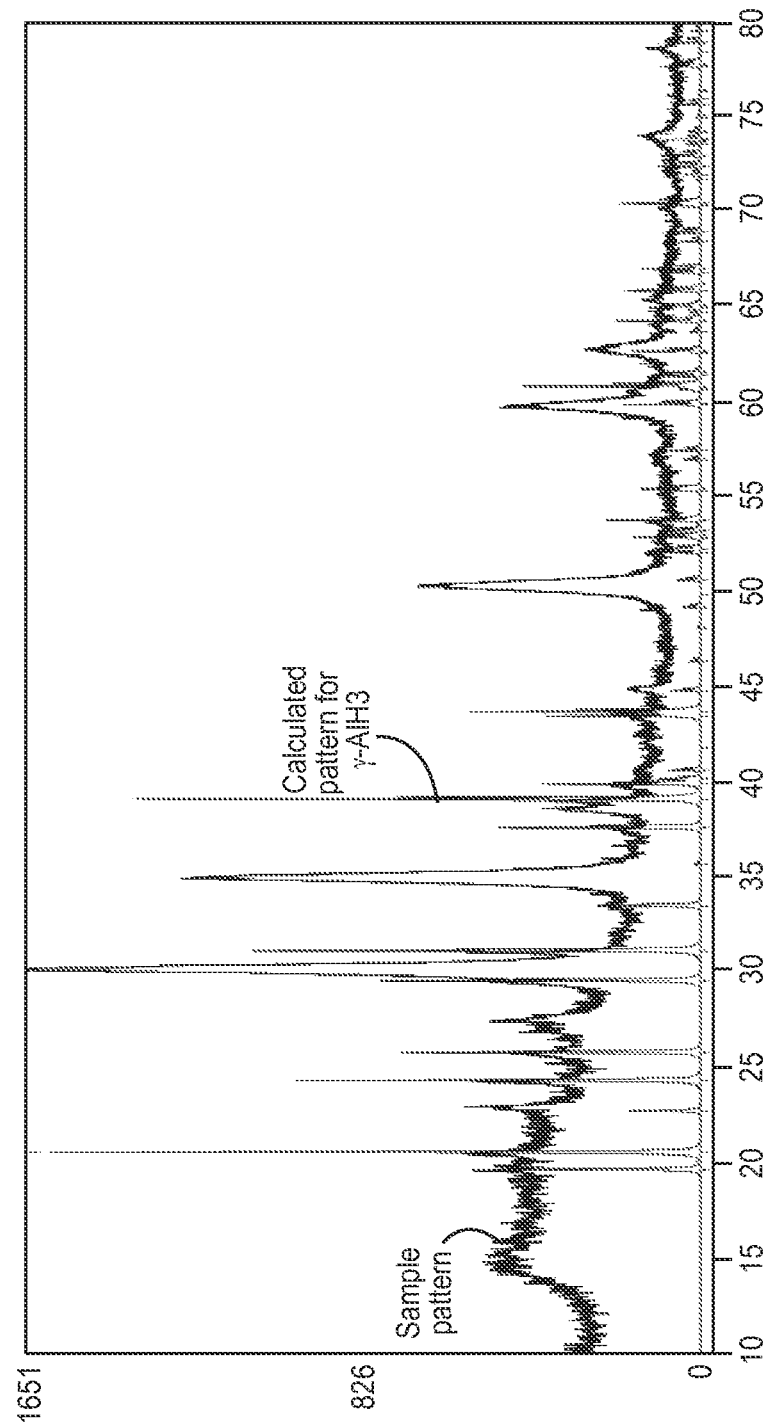

A similar reaction carried out with 4:1 mixture of $LiAlH_4$ and $AlCl_3$ also proceeded without the formation of metallic aluminum FIG. 8B and pattern d in FIG. 8A. Remarkably however, in this case γ-$AlH_3$ is favored over α or α' polymorph. The XRD pattern of this sample along with the calculated pattern for γ-$AlH_3$ is shown in FIG. 9, in which the horizontal axis is Bragg angle in degrees, and the vertical axis is diffracted intensity in arbitrary units. Each of the reactions of FIGS. 8A and 8B were carried out in the Fritsch Planetary mill at 300 rpm for indicated times.

Furthermore, when the amount of heptane was reduced from 20 ml to 1 ml per 1 g of powder, the transformation was still successful and significant increase in the rate was also observed. As shown in FIG. 8B, the transformation was nearly complete after 60 min of milling. It is also noteworthy that for the later reactions in which smaller volumes of heptane were used, a and α' polymorphs rather than the γ phase was observed as in case of dry milling. It is also noted that α' phase is formed initially that transforms to the more stable α-phase as the milling is continued.

Figure 10:
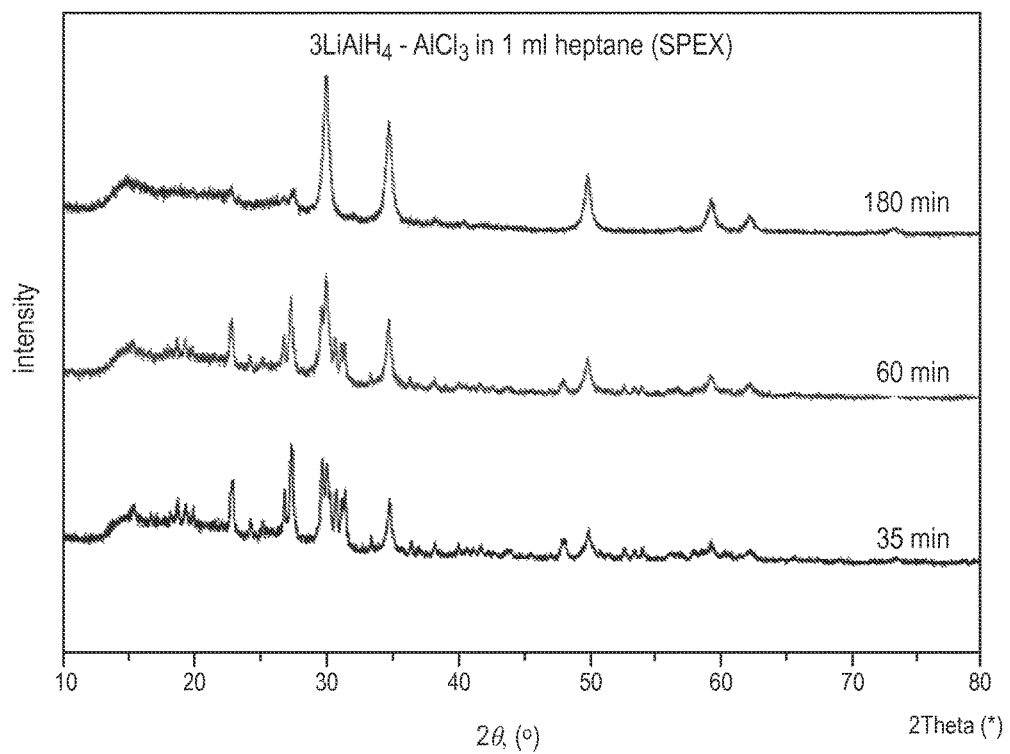

Inspired by these results, which suggest that formation of metallic aluminum may be completely suppressed if the milling is carried in the presence of a small amount of inert hydrocarbon liquids, an attempt was made to run a similar reaction in a higher energy SPEX mill. When a SPEX mill was employed for carrying out the transformation under dry conditions at 1 bar, metallic aluminum was obtained after just 5 min of milling. Our experiments indicate that the transformation could be successfully carried out in a high energy (SPEX) mill in the presence of as little as 0.5 ml heptane (about 40% v/v). FIG. 10 is a plot of XRD patterns of products obtained from mechanochemical reaction in high energy SPEX mill in 1 ml heptane. Results of reaction carried out with 0.5 ml heptane are similar and are not shown here. As seen from the XRD patterns shown in FIG. 10, in spite of the higher milling intensity in the SPEX mill compared to the planetary style mill, the reaction takes longer than 60 min to complete.

Although the role of heptane in preventing the formation of metallic aluminum is not completely understood, empirical evidence (thermal desorption of hydrogen from the product) suggests that the synthesized alane is dry and not a solvent adduct. These results clearly demonstrate that the mechanochemical synthesis of alane from the said transformation may be carried out in a highly simplified process that may be carried at room temperature and under an inert gas at ambient pressure. Furthermore, it is also established that milling intensity may not be a critical factor as long as synthesis is performed in small amounts of inert hydrocarbon liquid.

Although the results are described here specifically for heptane, it is understood that any other quick drying, inert liquid, including linear, branched, or cyclic saturated and unsaturated hydrocarbons, such as pentane, hexane, isooctane, cyclohexane, benzene, toluene, substituted hydrocarbons, and other (as long as the liquid does not react or dissolves any of the starting reactants or the produced $AlH_3$), may also be employed.

Examples of the method described herein may offer several benefits, e.g., as compared to other example methods of production of $AlH_3$. For example, examples of disclose may afford the production of un-solvated $AlH_3$ which reduces the use of potentially hazardous solvents (such as ether or amines) only to the purification step or completely eliminates the use of solvents by using flotation, density based separation in a liquid, ultracentrifugation or cyclonic separation of alane from LiCl, LiBr or LiI byproducts.

As another example, in some examples of the disclosure, underlying mechanochemical transformation is achieved at or around room temperature which thereby eliminates the need to cool the system with liquid nitrogen to 77 K (which could be a potential detriment for large scale production of $AlH_3$).

As another example, is some examples of the disclosure, the reaction is essentially complete within one hour and quantitative with >97% yield of $AlH_3$.

As another example, in some examples of the disclosure, only stoichiometric proportions of reactants are required thereby eliminating the use of reagents in excess, as is essential in some of the methods described earlier (for eg. direct thermal reaction of excess $LiAlH_4$ and $AlCl_3$).

As another example, in some examples of the disclosure, such simplification of the synthetic procedure will essentially enhance the ability to scale-up the production of un-solvated $AlH_3$ using this well-known reaction.

As another example, in some examples of the disclosure, the method eliminates the need for precise control of working temperature, which is an essential aspect of direct thermal method to reduce the risk of $AlH_3$ decomposition.

As another example, in some examples of the disclosure, the demonstrated ability to carry out this transformation with Aluminum triiodide ($AlI_3$) under ambient conditions of temperature and pressure not only offers a convenient synthetic route but also affords by-product with much higher density compared with $AlH_3$ and thereby presents an opportunity to carry out a more convenient and scalable gravimetric separations.

As another example, in some examples of the disclosure, the ability to carry out the mechanochemical transformation starting with LiH and $AlCl_3$ (or Li and $AlCl_3$) to synthesize $AlH_3$ in a one-pot process has an addition cost benefit, since $LiAlH_4$ is commercially produced from LiH and $AlCl_3$, and LiH in turn is produced by reacting Li metal with hydrogen gas at elevated temperatures.

Various examples have been described. These and other examples fall within the scope of the following claims. Further aspects of this disclosure may include one or more of those examples described in "Dry Mechanochemical Synthesis of Alane from LiH and $AlCl_3$," Hlova et al., Faraday Discuss 2014; 170:137-53; doi: 10.1039/C3FD00161J and in "Solvent-free Mechanochemical Synthesis of Alane $AlH_3$: Effect of pressure on the Reaction Pathway," Gupta et al., Green Chemistry 2014; 16:4378-88' doi: 10.1039/c4gc00998c. The entire content of each of these papers is incorporated herein by reference. However, examples of the disclosure are not limited as such.

The invention claimed is:

1. A method of forming alane ($AlH_3$), the method comprising reacting one of: 1) a $MAlH_4$, wherein M is an alkali metal; 2) an alkali metal hydride, MH; or 3) an alkali metal with one or more aluminum halides ($AlX_3$, where X is a halogen), via a mechanochemical process, to form the alane,
   wherein the reaction is solvent free and carried out in an environment with a temperature between approximately 250 K and approximately 330 K,
   wherein the reaction is carried out in a pressure of hydrogen or a pressure of an inert gas, wherein the pressure of the hydrogen or the pressure of the inert gas is greater than or equal to a critical pressure for the reaction, and
   wherein the pressure of hydrogen or the pressure of the inert gas is greater than atmospheric pressure.

2. The method of claim 1, wherein no heat is added externally or removed by cooling during the reaction.

3. The method of claim 1, wherein the temperature of the environment is between approximately 283 K and approximately 313 K.

4. The method of claim 1, wherein the reaction is carried out at the pressure of the hydrogen less than approximately 350 bar.

5. The method of claim 1, wherein the reaction is carried out at the pressure of the inert gas less than approximately 350 bar.

6. The method of claim 5, wherein the inert gas comprises helium, neon, argon, krypton, xenon, or a mixture thereof.

7. The method of claim 5, wherein the inert gas comprises a saturated or unsaturated linear, branched or cyclic hydrocarbon that contains from 1 to 5 carbon atoms per molecule.

8. The method of claim 5, wherein the inert gas comprises a gas that does not chemically react with any of the reactants and with the formed $AlH_3$.

9. The method of claim 1, wherein the reaction is carried out in the presence of excess $MAlH_4$.

10. The method of claim 9, wherein the amount of $MAlH_4$ varies between approximately 3.01 and approximately 10 moles per mole of the aluminum halide.

11. The method of claim 1, wherein no metallic Al is formed by the reaction.

12. The method of claim 1, wherein the reaction yields are greater than approximately 50% alane.

13. The method of claim 12, wherein the reaction yields are greater than approximately 90% alane.

14. The method of claim 1, wherein the mechanochemical process comprises at least one of ball milling, jet milling, or screw extrusion.

15. The method of claim 1, wherein the reaction is carried out at the pressure of hydrogen or the inert gas that is greater than or equal to the critical pressure for the reaction, wherein the critical pressure for the reaction is a threshold pressure at or above which metallic aluminum does not form in quantities that can be detected by standard analytical tools.

16. The method of claim 1, wherein the critical pressure is dependent on at least one of milling energy, milling speed, molecular weight of the inert gas, and powder to milling media ratio.

17. The method of claim 1, wherein the one of the $MAlH_4$, the alkali metal hydride, MH, or the alkali metal is in a stoichiometric excess.

18. The method of claim 1, further comprising controlling a milling speed and a ball to powder ratio of the mechanochemical process to obtain the critical pressure greater than the atmospheric pressure.

* * * * *